(12) United States Patent
Rhoades et al.

(10) Patent No.: US 10,936,926 B1
(45) Date of Patent: Mar. 2, 2021

(54) SYSTEMS AND METHODS FOR SENSOR MECHANISMS FOR MAGNETIC CARDS AND DEVICES

(71) Applicant: Dynamics Inc., Cheswick, PA (US)

(72) Inventors: Randy L. Rhoades, Swissvale, PA (US); James H. Workley, Imperial, PA (US); Jeffrey D. Mullen, Glenshaw, PA (US)

(73) Assignee: DYNAMICS INC., Pittsburgh, PA (US)

( * ) Notice: Subject to any disclaimer, the term of this patent is extended or adjusted under 35 U.S.C. 154(b) by 0 days.

(21) Appl. No.: 15/796,840

(22) Filed: Oct. 29, 2017

Related U.S. Application Data

(63) Continuation of application No. 15/133,538, filed on Apr. 20, 2016, now Pat. No. 9,881,245, which is a continuation of application No. 14/101,576, filed on Dec. 10, 2013, now Pat. No. 9,349,089, which is a continuation of application No. 13/478,995, filed on May 23, 2012, now Pat. No. 8,628,022.

(60) Provisional application No. 61/489,190, filed on May 23, 2011.

(51) Int. Cl.
*G06K 19/06* (2006.01)
*G06K 7/08* (2006.01)

(52) U.S. Cl.
CPC ....... *G06K 19/06206* (2013.01); *G06K 7/084* (2013.01)

(58) Field of Classification Search
None
See application file for complete search history.

(56) References Cited

U.S. PATENT DOCUMENTS

| | | |
|---|---|---|
| 4,353,064 A | 10/1982 | Stamm |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

*Primary Examiner* — Kristy A Haupt

(57) ABSTRACT

A card exhibiting multiple linear arrays of sensors are provided to detect a presence and movement of an external object (e.g., a read-head of a magnetic stripe reader). Each sensor of each array of sensors may be independently connected to a dual port of a processor so that the processor may determine a direction in which the card is swiped through a magnetic stripe reader. A portion of sensors of each array of sensors may be shared by a portion of inputs and/or outputs of a single port of a processor. Sensors may be cross-coupled to a single processor port so that forward and reverse directions of a card swipe may nevertheless be detected by a single-port processor of a card.

18 Claims, 9 Drawing Sheets

(56) References Cited

U.S. PATENT DOCUMENTS

| | | |
|---|---|---|
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,253,345 A | 10/1993 | Fernandes et al. |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,195,414 B1 | 2/2001 | Simmons et al. |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,915,955 B2 | 7/2005 | Jung et al. |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,784,687 B2 | 8/2010 | Mullen et al. |
| 7,793,851 B2 | 9/2010 | Mullen |
| 7,828,207 B2 | 11/2010 | Cooper |
| 7,828,220 B2 | 11/2010 | Mullen |
| 7,931,195 B2 | 4/2011 | Mullen |
| 7,954,705 B2 | 6/2011 | Mullen |
| D643,063 S | 8/2011 | Mullen et al. |
| 8,011,577 B2 | 9/2011 | Mullen et al. |
| 8,020,775 B2 | 9/2011 | Mullen et al. |
| 8,066,191 B1 | 11/2011 | Cloutier et al. |
| D651,237 S | 12/2011 | Mullen et al. |
| D651,238 S | 12/2011 | Mullen et al. |
| 8,074,877 B2 | 12/2011 | Mullen et al. |
| D651,644 S | 1/2012 | Mullen et al. |
| D652,075 S | 1/2012 | Mullen et al. |
| D652,076 S | 1/2012 | Mullen et al. |
| D652,448 S | 1/2012 | Mullen et al. |

(56) References Cited

U.S. PATENT DOCUMENTS

| | | |
|---|---|---|
| D652,449 S | 1/2012 | Mullen et al. |
| D652,450 S | 1/2012 | Mullen et al. |
| D652,867 S | 1/2012 | Mullen et al. |
| D653,288 S | 1/2012 | Mullen et al. |
| 8,172,148 B1 | 5/2012 | Cloutier et al. |
| 8,226,001 B1 * | 7/2012 | Foo ............... G06K 19/06206 235/449 |
| D665,022 S | 8/2012 | Mullen et al. |
| D665,447 S | 8/2012 | Mullen et al. |
| D666,241 S | 8/2012 | Mullen et al. |
| 8,282,007 B1 | 10/2012 | Cloutier et al. |
| 8,286,876 B2 | 10/2012 | Mullen et al. |
| D670,329 S | 11/2012 | Mullen et al. |
| D670,330 S | 11/2012 | Mullen et al. |
| D670,331 S | 11/2012 | Mullen et al. |
| D670,332 S | 11/2012 | Mullen et al. |
| D670,759 S | 11/2012 | Mullen et al. |
| 8,302,872 B2 | 11/2012 | Mullen |
| D672,389 S | 12/2012 | Mullen et al. |
| 8,322,623 B1 | 12/2012 | Mullen et al. |
| D674,013 S | 1/2013 | Mullen et al. |
| 8,348,172 B1 | 1/2013 | Cloutier et al. |
| D676,904 S | 2/2013 | Mullen et al. |
| 8,382,000 B2 | 2/2013 | Mullen et al. |
| 8,393,545 B1 | 3/2013 | Mullen et al. |
| 8,393,546 B1 | 3/2013 | Yen et al. |
| 8,413,892 B2 | 4/2013 | Mullen et al. |
| 8,424,773 B2 | 4/2013 | Mullen et al. |
| 8,459,548 B2 | 6/2013 | Mullen et al. |
| D687,094 S | 7/2013 | Mullen et al. |
| 8,485,437 B2 | 7/2013 | Mullen et al. |
| 8,485,446 B1 | 7/2013 | Mullen et al. |
| 8,511,574 B1 | 8/2013 | Yen et al. |
| 8,517,276 B2 | 8/2013 | Mullen et al. |
| 8,523,059 B1 | 9/2013 | Mullen et al. |
| 8,561,894 B1 | 10/2013 | Mullen et al. |
| 8,567,679 B1 | 10/2013 | Mullen et al. |
| 8,573,503 B1 | 11/2013 | Cloutier et al. |
| 8,579,203 B1 | 11/2013 | Lambeth et al. |
| 8,590,796 B1 | 11/2013 | Cloutier et al. |
| 8,602,312 B2 | 12/2013 | Cloutier et al. |
| 8,608,083 B2 | 12/2013 | Mullen et al. |
| 8,622,309 B1 | 1/2014 | Mullen et al. |
| 8,668,143 B2 | 3/2014 | Mullen et al. |
| 8,727,219 B1 | 5/2014 | Mullen |
| 8,733,638 B2 | 5/2014 | Mullen et al. |
| 8,746,579 B1 | 6/2014 | Cloutier et al. |
| 8,757,483 B1 | 6/2014 | Mullen et al. |
| 8,757,499 B2 | 6/2014 | Cloutier et al. |
| 8,814,050 B1 | 8/2014 | Mullen et al. |
| 8,875,999 B2 | 11/2014 | Mullen et al. |
| 8,881,989 B2 | 11/2014 | Mullen et al. |
| 8,931,703 B1 | 1/2015 | Mullen et al. |
| 8,944,333 B1 | 2/2015 | Mullen et al. |
| 8,973,824 B2 | 3/2015 | Mullen et al. |
| 9,004,368 B2 | 4/2015 | Mullen et al. |
| 9,010,630 B2 | 4/2015 | Mullen et al. |
| 9,053,398 B1 | 6/2015 | Cloutier |
| 9,064,255 B1 | 6/2015 | Mullen et al. |
| 9,292,843 B1 | 3/2016 | Mullen et al. |
| 9,306,666 B1 | 4/2016 | Zhang et al. |
| 9,329,619 B1 | 5/2016 | Cloutier |
| 9,361,569 B2 | 6/2016 | Mullen et al. |
| 9,373,069 B2 | 6/2016 | Cloutier et al. |
| 9,384,438 B2 | 7/2016 | Mullen et al. |
| 9,547,816 B2 | 1/2017 | Mullen et al. |
| 9,639,796 B2 | 5/2017 | Mullen et al. |
| 9,646,240 B1 | 5/2017 | Mullen et al. |
| 9,652,436 B1 | 5/2017 | Yen et al. |
| 9,684,861 B2 | 6/2017 | Mullen et al. |
| D792,511 S | 7/2017 | Mullen et al. |
| D792,512 S | 7/2017 | Mullen et al. |
| D792,513 S | 7/2017 | Mullen et al. |
| 9,697,454 B2 | 7/2017 | Mullen et al. |
| 9,704,088 B2 | 7/2017 | Mullen et al. |
| 9,704,089 B2 | 7/2017 | Mullen et al. |
| 9,721,201 B1 | 8/2017 | Mullen et al. |
| 9,727,813 B2 | 8/2017 | Mullen et al. |
| 9,805,297 B2 | 10/2017 | Mullen et al. |
| 9,818,125 B2 | 11/2017 | Mullen et al. |
| 9,836,680 B1 | 12/2017 | Cloutier |
| 9,852,368 B1 | 12/2017 | Yen et al. |
| 9,875,437 B2 | 1/2018 | Cloutier et al. |
| 9,928,456 B1 | 3/2018 | Cloutier et al. |
| 9,953,255 B1 | 4/2018 | Yen et al. |
| 10,022,884 B1 | 7/2018 | Cloutier |
| 10,032,100 B2 | 7/2018 | Mullen et al. |
| 10,055,614 B1 | 8/2018 | Cloutier et al. |
| 10,095,970 B1 | 10/2018 | Mullen |
| 10,095,974 B1 | 10/2018 | Mullen et al. |
| 10,169,692 B2 | 1/2019 | Mullen et al. |
| 10,176,419 B1 | 1/2019 | Cloutier et al. |
| 10,176,423 B1 | 1/2019 | Mullen et al. |
| 10,181,097 B1 | 1/2019 | Mullen et al. |
| 10,198,687 B2 | 2/2019 | Mullen et al. |
| 10,223,631 B2 | 3/2019 | Mullen et al. |
| 10,255,545 B2 | 4/2019 | Mullen et al. |
| 10,325,199 B2 | 6/2019 | Mullen et al. |
| 10,430,704 B2 | 10/2019 | Mullen et al. |
| 10,467,521 B2 | 11/2019 | Mullen et al. |
| 10,482,363 B1 | 11/2019 | Cloutier et al. |
| 10,496,918 B2 | 12/2019 | Mullen et al. |
| 10,504,105 B2 | 12/2019 | Mullen et al. |
| 10,579,920 B2 | 3/2020 | Mullen et al. |
| 10,693,263 B1 | 6/2020 | Mullen et al. |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0241183 A1 | 10/2007 | Brown et al. |
| 2007/0241201 A1 | 10/2007 | Brown et al. |
| 2007/0256123 A1 | 11/2007 | Duane et al. |

(56) References Cited

U.S. PATENT DOCUMENTS

| | | |
|---|---|---|
| 2007/0192249 A1 | 12/2007 | Biffle et al. |
| 2007/0290049 A1 | 12/2007 | Ratcliffe |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0029607 A1 | 2/2008 | Mullen |
| 2008/0035738 A1 | 2/2008 | Mullen |
| 2008/0040271 A1 | 2/2008 | Hammad et al. |
| 2008/0040276 A1 | 2/2008 | Hammad et al. |
| 2008/0054068 A1 | 3/2008 | Mullen |
| 2008/0054079 A1 | 3/2008 | Mullen |
| 2008/0054081 A1 | 3/2008 | Mullen |
| 2008/0058016 A1 | 3/2008 | Di Maggio et al. |
| 2008/0059379 A1 | 3/2008 | Ramaci et al. |
| 2008/0065555 A1 | 3/2008 | Mullen |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302869 A1 | 12/2008 | Mullen |
| 2008/0302876 A1 | 12/2008 | Mullen |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159667 A1 | 6/2009 | Mullen et al. |
| 2009/0159668 A1 | 6/2009 | Mullen et al. |
| 2009/0159669 A1 | 6/2009 | Mullen et al. |
| 2009/0159670 A1 | 6/2009 | Mullen et al. |
| 2009/0159671 A1 | 6/2009 | Mullen et al. |
| 2009/0159672 A1 | 6/2009 | Mullen et al. |
| 2009/0159673 A1 | 6/2009 | Mullen et al. |
| 2009/0159680 A1 | 6/2009 | Mullen et al. |
| 2009/0159681 A1 | 6/2009 | Mullen et al. |
| 2009/0159682 A1 | 6/2009 | Mullen et al. |
| 2009/0159688 A1 | 6/2009 | Mullen et al. |
| 2009/0159689 A1 | 6/2009 | Mullen et al. |
| 2009/0159690 A1 | 6/2009 | Mullen et al. |
| 2009/0159696 A1 | 6/2009 | Mullen |
| 2009/0159697 A1 | 6/2009 | Mullen et al. |
| 2009/0159698 A1 | 6/2009 | Mullen et al. |
| 2009/0159699 A1 | 6/2009 | Mullen et al. |
| 2009/0159700 A1 | 6/2009 | Mullen et al. |
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159706 A1 | 6/2009 | Mullen et al. |
| 2009/0159707 A1 | 6/2009 | Mullen et al. |
| 2009/0159708 A1 | 6/2009 | Mullen et al. |
| 2009/0159709 A1 | 6/2009 | Mullen |
| 2009/0159710 A1 | 6/2009 | Mullen et al. |
| 2009/0159711 A1 | 6/2009 | Mullen et al. |
| 2009/0159712 A1 | 6/2009 | Mullen et al. |
| 2009/0159713 A1 | 6/2009 | Mullen et al. |
| 2009/0160617 A1 | 6/2009 | Mullen et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2009/0308921 A1 | 12/2009 | Mullen |
| 2011/0028184 A1 | 2/2011 | Cooper |
| 2011/0272465 A1 | 11/2011 | Mullen et al. |
| 2011/0272466 A1 | 11/2011 | Mullen et al. |
| 2011/0272467 A1 | 11/2011 | Mullen et al. |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272476 A1 | 11/2011 | Mullen et al. |
| 2011/0272477 A1 | 11/2011 | Mullen et al. |
| 2011/0272478 A1 | 11/2011 | Mullen |
| 2011/0272479 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0272483 A1 | 11/2011 | Mullen et al. |
| 2011/0272484 A1 | 11/2011 | Mullen et al. |
| 2011/0276380 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0276436 A1 | 11/2011 | Mullen et al. |
| 2011/0276437 A1 | 11/2011 | Mullen et al. |
| 2011/0278364 A1 | 11/2011 | Mullen et al. |
| 2011/0282753 A1 | 11/2011 | Mullen et al. |
| 2011/0284632 A1 | 11/2011 | Mullen et al. |
| 2011/0284640 A1 | 11/2011 | Mullen et al. |
| 2012/0024952 A1 | 2/2012 | Chen |
| 2012/0028702 A1 | 2/2012 | Mullen et al. |
| 2012/0037709 A1 | 2/2012 | Cloutier et al. |
| 2012/0052800 A1 | 3/2012 | Bona et al. |
| 2012/0197708 A1 | 8/2012 | Mullen et al. |
| 2012/0209744 A1 | 8/2012 | Mullen et al. |
| 2012/0254037 A1 | 10/2012 | Mullen |
| 2012/0254038 A1 | 10/2012 | Mullen |
| 2012/0280035 A1 | 11/2012 | Liu et al. |
| 2012/0286037 A1 | 11/2012 | Mullen et al. |
| 2012/0286928 A1 | 11/2012 | Mullen et al. |
| 2012/0286936 A1 | 11/2012 | Mullen et al. |
| 2012/0290449 A1 | 11/2012 | Mullen et al. |
| 2012/0290472 A1 | 11/2012 | Mullen et al. |
| 2012/0318871 A1 | 12/2012 | Mullen et al. |
| 2012/0326013 A1 | 12/2012 | Cloutier et al. |
| 2013/0020396 A1 | 1/2013 | Mullen et al. |
| 2013/0282573 A1 | 10/2013 | Mullen et al. |
| 2013/0282575 A1 | 10/2013 | Mullen et al. |
| 2013/0320080 A1 | 12/2013 | Olson et al. |
| 2014/0054384 A1 | 2/2014 | Cloutier et al. |
| 2015/0186766 A1 | 7/2015 | Mullen et al. |
| 2016/0162713 A1 | 6/2016 | Cloutier et al. |
| 2016/0180209 A1 | 6/2016 | Mullen et al. |
| 2016/0239735 A1 | 8/2016 | Mullen et al. |
| 2016/0283837 A1 | 9/2016 | Mullen et al. |
| 2016/0307085 A1 | 10/2016 | Mullen et al. |
| 2016/0335529 A1 | 11/2016 | Mullen et al. |
| 2016/0342876 A1 | 11/2016 | Mullen et al. |
| 2016/0342877 A1 | 11/2016 | Mullen et al. |
| 2016/0342878 A1 | 11/2016 | Mullen et al. |
| 2016/0342879 A1 | 11/2016 | Mullen et al. |
| 2016/0342880 A1 | 11/2016 | Mullen et al. |
| 2017/0286817 A1 | 10/2017 | Mullen et al. |
| 2017/0300796 A1 | 10/2017 | Mullen et al. |
| 2018/0053079 A1 | 2/2018 | Cloutier et al. |
| 2018/0060881 A1 | 3/2018 | Mullen et al. |
| 2019/0042903 A1 | 2/2019 | Cloutier et al. |
| 2019/0065928 A1 | 2/2019 | Mullen et al. |
| 2019/0197387 A1 | 6/2019 | Mullen et al. |
| 2019/0340484 A1 | 11/2019 | Mullen et al. |
| 2020/0082383 A1 | 3/2020 | Mullen et al. |

FOREIGN PATENT DOCUMENTS

| | | |
|---|---|---|
| WO | WO0247019 | 6/2002 |
| WO | WO06066322 | 6/2006 |
| WO | WO06080929 | 8/2006 |

(56) References Cited

FOREIGN PATENT DOCUMENTS

| WO | WO06105092 | 10/2006 |
|---|---|---|
| WO | WO06116772 | 11/2006 |
| WO | WO08064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack/org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

\* cited by examiner

SYSTEMS AND METHODS FOR SENSOR MECHANISMS FOR MAGNETIC CARDS AND DEVICES

CROSS-REFERENCE TO RELATED APPLICATION

This application is a continuation of U.S. patent application Ser. No. 15/133,538, titled "SYSTEMS AND METHODS FOR SENSOR MECHANISMS FOR MAGNETIC CARDS AND DEVICES," filed on Apr. 20, 2016, which is a continuation of U.S. patent application Ser. No. 14/101,576, titled "SYSTEMS AND METHODS FOR SENSOR MECHANISMS FOR MAGNETIC CARDS AND DEVICES," filed on Dec. 10, 2013, which is a continuation of U.S. patent application Ser. No. 13/478,995, titled "SYSTEMS AND METHODS FOR SENSOR MECHANISMS FOR MAGNETIC CARDS AND DEVICES," filed on May 23, 2012, which claims the benefit of U.S. Provisional Patent Application No. 61/489,190, titled "SYSTEMS AND METHODS FOR SENSOR MECHANISMS FOR MAGNETIC CARDS AND DEVICES," filed May 23, 2011, each of which is hereby incorporated by reference herein in its entirety.

BACKGROUND OF THE INVENTION

This invention relates to magnetic cards and devices and related systems.

SUMMARY OF THE INVENTION

A card may include a dynamic magnetic stripe communications device, which may take the form of a magnetic encoder or a magnetic emulator. A magnetic encoder, for example, may be utilized to modify information that is located on a magnetic medium, such that a magnetic stripe reader may then be utilized to read the modified magnetic information from the magnetic medium. A magnetic emulator, for example, may be provided to generate electromagnetic fields that directly communicate data to a read head of a magnetic stripe reader. A magnetic emulator, for example, may communicate data serially to a read-head of the magnetic stripe reader. A magnetic emulator, for example, may communicate data in parallel to a read-head of the magnetic stripe reader.

All, or substantially all, of the front surface, as well as the rear surface, of a card may be implemented as a display (e.g., bi-stable, non bi-stable, LCD, or electrochromic display). Electrodes of a display may be coupled to one or more touch sensors, such that a display may be sensitive to touch (e.g., using a finger or a pointing device) and may be further sensitive to a location of the touch. The display may be sensitive, for example, to objects that come within a proximity of the display without actually touching the display.

A dynamic magnetic stripe communications device may be implemented on a multiple layer board (e.g., a two layer flexible printed circuit board). A coil for each track of information that is to be communicated by the dynamic magnetic stripe communications device may then be provided by including wire segments on each layer and interconnecting the wire segments through layer interconnections to create a coil. For example, a dynamic magnetic stripe communications device may include two coils such that two tracks of information may be communicated to two different read-heads included in a read-head housing of a magnetic stripe reader. A dynamic magnetic communications device may include, for example, three coils such that three tracks of information may be communicated to three different read-heads included in a read-head housing of a magnetic stripe reader.

One or more arrays of sensors may be provided, for example, to sense the presence of an external object, such as a person or device; which in turn, may trigger the initiation of a communication sequence with the external object. The sensed presence of the external object may then be communicated to a processor of a card, which in turn may direct the exchange of information between a processor of a card and the external object. Accordingly, timing aspects of the information exchange between a processor of a card and the various I/O devices implemented on a card may also be determined by a processor of the card.

The sensed presence of the external object or device may include the type of object or device that is sensed and, therefore, may then determine the type of communication that is to be used with the sensed object or device. For example, a sensed object may include a determination that the object is a read-head of a magnetic stripe reader. Such a sensed identification, for example, may activate a dynamic magnetic stripe communications device so that information may be communicated electromagnetically to the read-head of the magnetic stripe reader.

A sensor array may be utilized in a variety of ways. Signals from a sensor array may, for example, cause a processor of a card to perform a particular function such as, for example, communicate bits of information in a forward or a reverse order to a read-head of a magnetic stripe reader. Accordingly, for example, a processor may detect that a card is being swiped in a forward direction based upon signals from two or more activated sensors and may, for example, electromagnetically communicate data bits in a direction (e.g., a forward direction) that is compatible with the sensed swipe direction. A processor may, for example, detect that a card is being swiped in a reverse direction based upon signals from two or more sensors and may, for example, electromagnetically communicate data bits in a direction (e.g., a reverse direction) that is compatible with the sensed swipe direction. A processor may, for example, detect a read-head position relative to a particular region on a card based upon signals from one or more activated sensors and may vary a communication rate at which data bits may be electromagnetically communicated based upon the detected read-head position.

A processor of a card may, for example, include a multiple input and/or output port (e.g., a dual input and/or output port) configuration. Accordingly, for example, each sensor of a card may be coupled to an individual pin of a respective port of a processor so that activations of two or more sensors in a particular sequence may allow a processor to determine a direction that a card is being swiped through a magnetic stripe reader.

A processor of a card may, for example, include a port configuration (e.g., a dual input and/or output port configuration) having a number of pins that does not match a number of sensors provided on a card. Accordingly, for example, a portion of the sensors may be individually coupled to a pin of one port of a processor, another portion of the sensors may be individually coupled to a pin of another port of a processor and yet another portion of the sensors may share pins between both ports of the processor.

A processor of a card may, for example, include a single port configuration having a number of pins that does not match a number of sensors provided on a card. Accordingly, for example, two or more sensors (e.g., multiple pairs of sensors) may share pins of a port of a processor. Appropriate sharing of a pair of sensors to a particular pin of a port of a processor may, for example, allow a processor to determine a direction of a swipe of a card based upon an order that a sequence of sensors are activated.

Sensors may be arranged, for example, in a linear fashion along a length of a card. Accordingly, for example, a processor may receive activations of several sensors in sequence according to a direction of a card swipe. In addition, a processor may determine which sensors are activated and based upon which sensors are activated, the processor may determine a position of a read-head of a magnetic stripe reader in relation to the card. In so doing, for example, a processor of a card may vary a rate that information bits are communicated to a read-head of a magnetic stripe reader based upon the sensed position of the read-head in relation to the card. A slow communication rate may, for example, be selected by a processor if a read-head position is sensed early during a card swipe event (e.g., a read-head is sensed relative to a leading edge of the card). An increased communication rate may, for example, be selected by a processor if a read-head position is sensed later during a card swipe event (e.g., a read-head is sensed between a leading edge of a card and an inner portion of the card). A maximum communication rate may, for example, be selected by a processor if a read-head position is sensed late during a card swipe event (e.g., a read-head is sensed at an inner portion of the card).

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
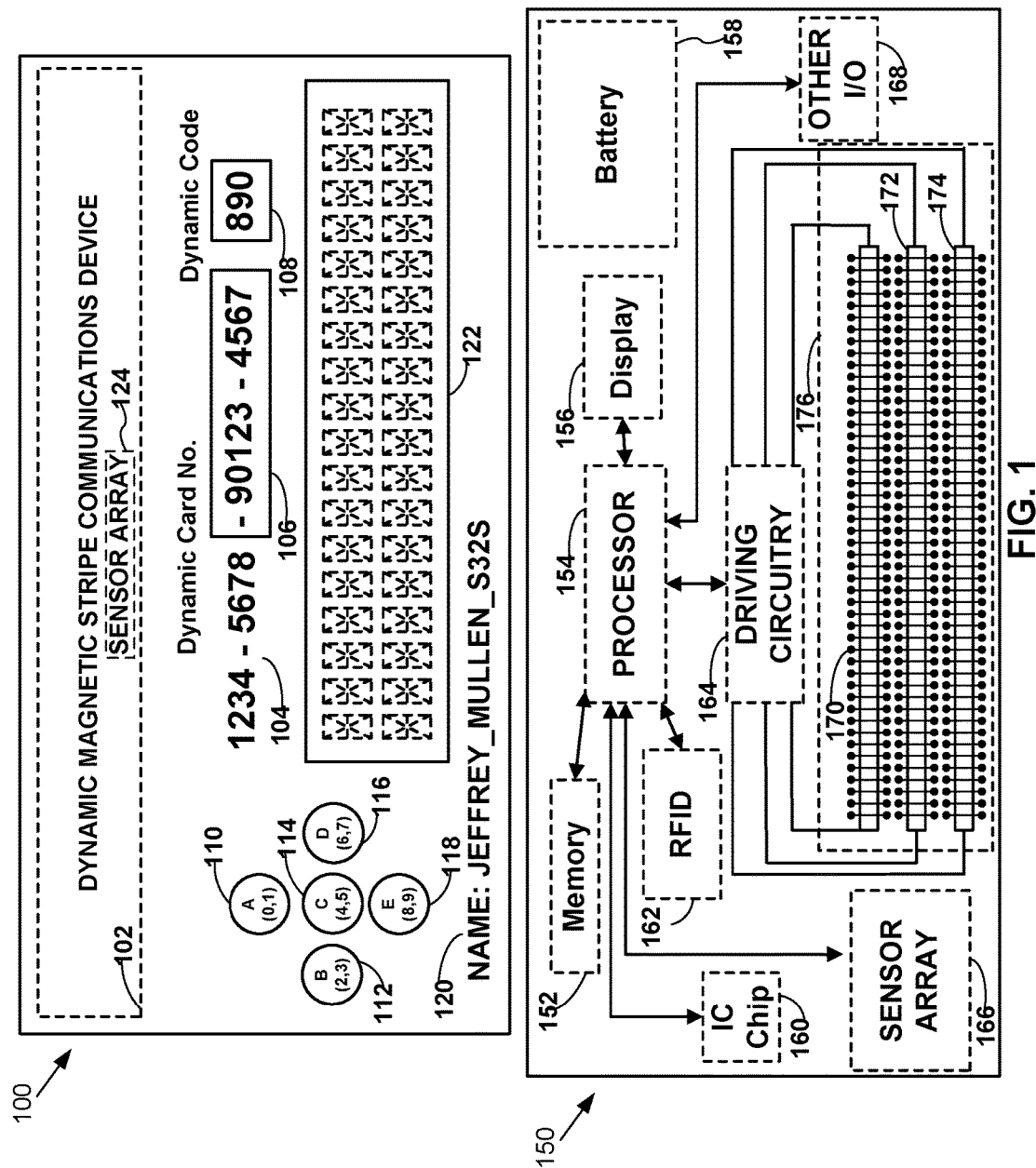
FIG. 1 is an illustration of cards constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, dynamic portion 106. Card 100 may include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may also be entirely, or partially, displayed via a second display, e.g., display 108. Display 108 may be utilized, for example, to display a dynamic code such as a dynamic security code. Card 100 may also include third display 122 that may be used to display graphical information, such as logos and barcodes. Third display 122 may also be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electro-chromic, may be provided as well.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength. Such information exchange may then be determined and processed by card 100 as data input.

Card 100 may include sensor array 124. Sensor array 124 may, for example, be a number of sensors (e.g., 16 sensors) arranged along a length of card 100 to sense contact with, or proximity to, an object (e.g., a read-head of a magnetic stripe reader). Sensor array 124 may, for example, be arranged as a number of conductive pads (e.g., copper islands on a surface of a printed circuit board). Sensor array 124 may, for example, exhibit a characteristic change (e.g., a change in capacitance) when an object contacts, or comes within a proximity to, sensor array 124.

FIG. 1 shows architecture 150, which may include one or more processors 154. One or more processors 154 may be configured to utilize external memory 152, memory internal to processor 154, or a combination of external memory 152 and internal memory for dynamically storing information, such as executable machine language, related dynamic machine data, and user input data values.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes. The data to be displayed on the display may be displayed on one or more displays 156.

One or more displays 156 may be, for example, touch sensitive and/or proximity sensitive. For example, objects such as fingers, pointing devices, etc., may be brought into contact with displays 156, or in proximity to displays 156. Detection of object proximity or object contact with displays 156 may be effective to perform any type of function (e.g., transmit data to processor 154). Displays 156 may have multiple locations that are able to be determined as being touched, or determined as being in proximity to an object.

Input and/or output devices may be implemented on a card (e.g., card 100 of FIG. 1). For example, integrated circuit (IC) chip 160 (e.g., an EMV chip) may be included that can communicate information to a chip reader (e.g., an EMV chip reader). Radio frequency identification (RFID) module 162 may be included to enable the exchange of information between an RFID reader and a card (e.g., card 100 of FIG. 1).

Other input and/or output devices 168 may be included on architecture 150, for example, to provide any number of input and/or output capabilities on a card (e.g., card 100 of FIG. 1). For example, other input and/or output devices 168 may include an audio device capable of receiving and/or transmitting audible information.

Other input and/or output devices 168 may include a device that exchanges analog and/or digital data using a visible data carrier. Other input and/or output devices 168 may include a device, for example, that is sensitive to a non-visible data carrier, such as an IR data carrier or electromagnetic data carrier. Any type of tactile, audible, visible, and/or non-visible means of information exchange may be provided within architecture 150.

Persons skilled in the art will appreciate that architecture 150 may, for example, be implemented within a self-contained device (e.g., card 100 of FIG. 1) that derives its own operational power from one or more batteries 158. Furthermore, one or more batteries 158 may be included, for example, to provide operational power for a period of time (e.g., approximately 2-4 years). One or more batteries 158 may be included, for example, as rechargeable batteries.

A dynamic magnetic stripe communications device may be included on a card to communicate information to, for example, a read-head of a magnetic stripe reader via electromagnetic signals. Electromagnetic field generators 170-174 may, for example, be included to communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a magnetic material and/or a non-magnetic material). Additional materials may be placed outside the coil (e.g., a magnetic material and/or a non-magnetic material).

Electrical excitation by processor 154 of one or more coils of one or more electromagnetic elements via, for example, driving circuitry 164 may be effective to generate electromagnetic fields from one or more electromagnetic elements. One or more electromagnetic field generators 170-174 may be utilized to communicate electromagnetic information to, for example, one or more read-heads of a magnetic stripe reader.

Timing aspects of information exchange between architecture 150 and the various I/O devices implemented on architecture 150 may be determined by processor 154. Sensor array 166 may be utilized, for example, to sense the proximity or actual contact of an external device, which in turn, may trigger the initiation of a communication sequence. The sensed presence or touch of the external device may then be communicated to a processor (e.g., one or more pins of one or more input and/or output ports of processor 154), which in turn may direct the exchange of information with the external device. The sensed presence or touch of the external device may be effective to, for example, determine the type of device or object detected.

For example, sensor array 166 and sensing circuitry internal to processor 154 may sense the presence of, for example, a read head of a magnetic stripe reader. In response, processor 154 may activate one or more electromagnetic field generators 170-174 to initiate a communication data sequence with, for example, one or more read-heads of the detected magnetic stripe reader. The timing relationships associated with communications between one or more electromagnetic field generators 170-174 and one or more read-heads of a magnetic stripe reader may be provided through use of the sensed presence of the one or more read-heads of the magnetic stripe reader.

Figure 2:
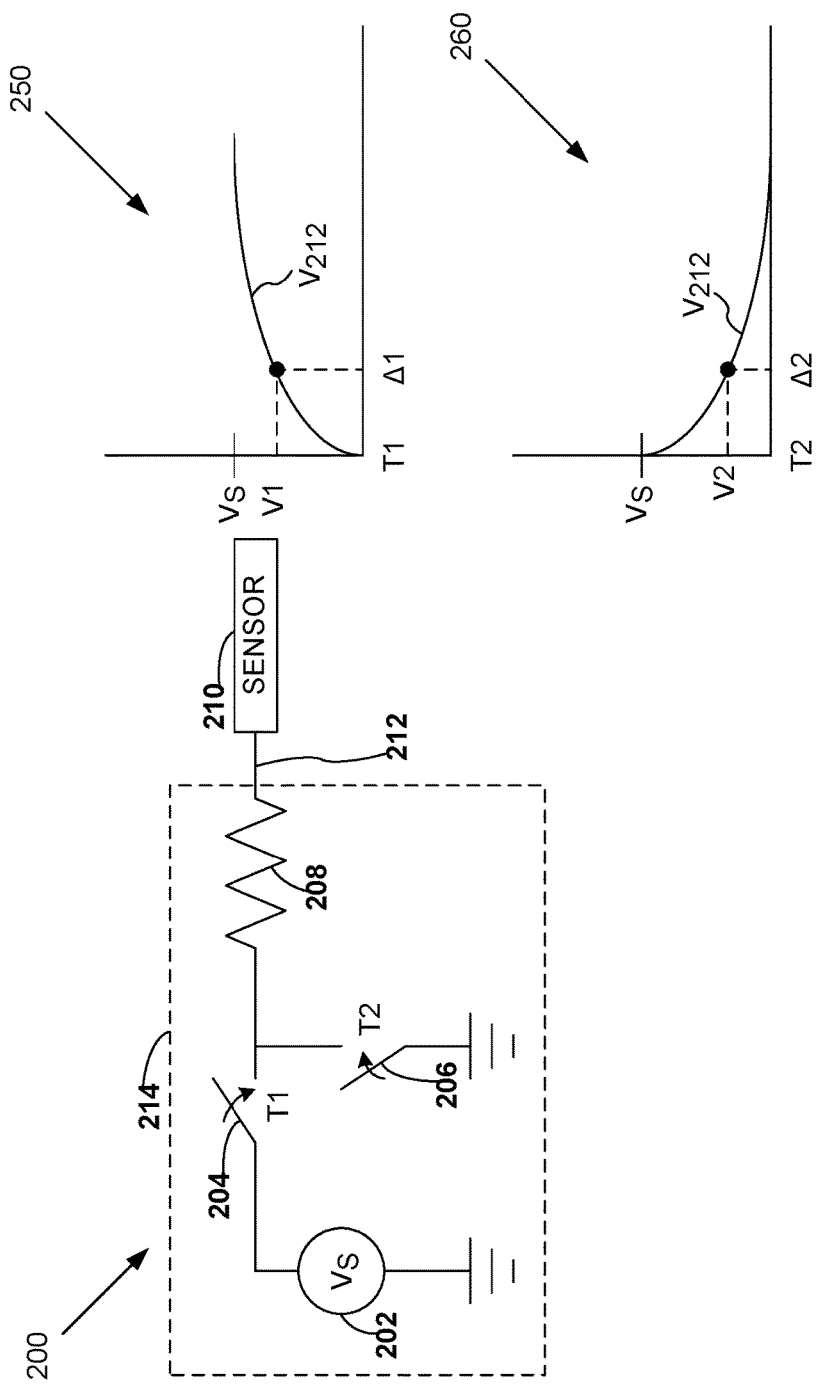
FIG. 2 is an illustration of circuitry, and associated waveforms, constructed in accordance with the principles of the present invention.

FIG. 2 shows sensing circuitry 200 that may, for example, be included within processor 214 of a card. Sensor 210 (e.g., a conductive pad on a printed circuit board of the card) may be utilized, for example, as a capacitive device within a resistor/capacitor (RC) circuit. Accordingly, for example, the RC circuit may be used to determine a relative capacitance of sensor 210, which may then be used to determine whether the relative capacitance of sensor 210 is below, equal to, or above a predetermined threshold.

A relative capacitance magnitude of sensor 210 may exhibit, for example, an inversely proportional relationship to the distance separation between sensor 210 and an object that may be in proximity to, or touching, sensor 210. For example, a capacitance magnitude of sensor 210 may be relatively small when a corresponding distance between sensor 210 and an external object may be relatively large. A capacitance magnitude of sensor 210 may be relatively large, for example, when the corresponding distance between sensor 210 and an external object is relatively small.

Charge sequence 250 may, for example, be invoked, such that switch 204 may be closed at time T1 while switch 206 may remain open. Accordingly, for example, current may flow from voltage supply 202 through switch 204 and resistive component 208. In doing so, for example, an electrostatic field may be generated that may be associated with sensor 210. During the charge sequence, for example, the voltage at node 212 may be monitored to determine the amount of time required (e.g., $T_{CHARGE} = \Delta1 - T1$) for the voltage at node 212, $V_{212}$, to obtain a magnitude that is substantially equal to, below, or above a first threshold voltage (e.g., equal to V1).

Discharge sequence 260 may, for example, be invoked, such that switch 206 may be closed at time T2, while switch 204 may remain open. During the discharge sequence, for example, the electric field associated with sensor 210 may be allowed to discharge through resistive component 208 to a reference potential (e.g., ground potential). The voltage at node 212 may be monitored to determine the amount of time required (e.g., $T_{DISCHARGE} = \Delta2 - T2$) for the voltage at node 212, $V_{212}$, to obtain a magnitude that is substantially equal to, below, or above a second threshold voltage (e.g., equal to V2).

Once the charge time, $T_{CHARGE}$, and discharge time, $T_{DISCHARGE}$, are determined, the charge and discharge times may be utilized to calculate a capacitance magnitude that may be exhibited by sensor 210. For example, given that the magnitude of voltage, V1, may be equal to approximately 63% of the magnitude of voltage, $V_S$, then a first relationship may be defined by equation (1) as:

$$T_{CHARGE} = R_{208} * C1, \quad (1)$$

where $R_{208}$ is the resistance magnitude of resistive element 208 and C1 is proportional to a capacitance magnitude of sensor 210.

Similarly, for example, given that the magnitude of voltage, V2, may be equal to approximately 37% of the magnitude of voltage, $V_S$, then a second relationship may be determined by equation (2) as:

$$T_{DISCHARGE} = R_{208} * C2, \quad (2)$$

where C2 is proportional to a capacitance magnitude of sensor 210. The capacitance magnitudes, $C_1$ and $C_2$, may then be calculated from equations (1) and (2) and averaged to determine an average capacitance magnitude that may be exhibited by sensor 210. Persons skilled in the art will appreciate that RC components (e.g., resistive component 208) may be included within processor 214 or may be included external to processor 214.

Figure 3:
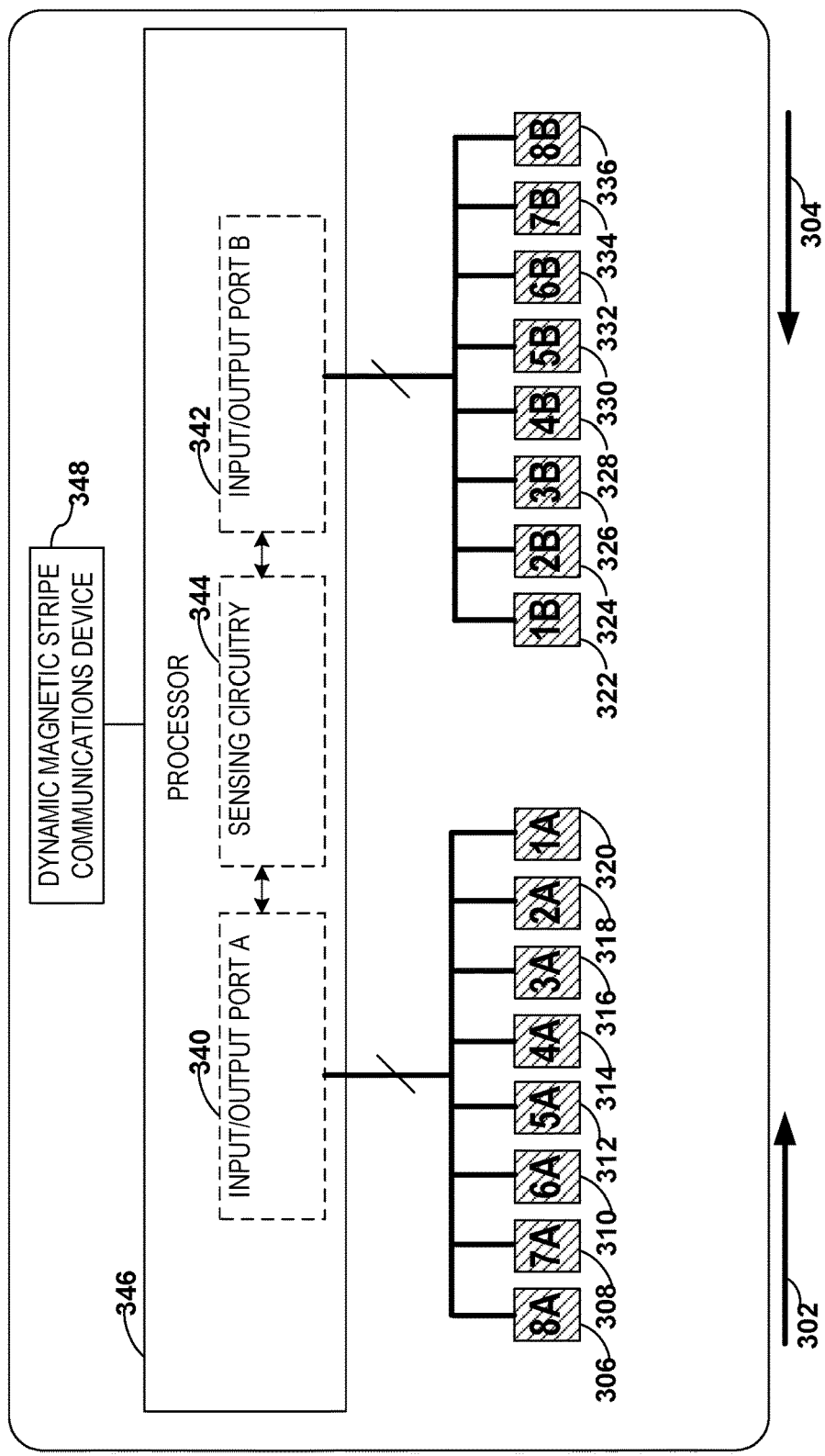
FIG. 3 is an illustration of a card constructed in accordance with the principles of the present invention.

FIG. 3 shows card 300, which may include processor 346 and multiple (e.g., two) arrays of sensors (e.g., sensors 306-320 and sensors 322-336). Sensors 306-320 may, for example, be arranged linearly and may be coupled to individual pins of input and/or output port 340, such that sensor 306 may be coupled to pin 8 of port 340, sensor 308 may be coupled to pin 7 of port 340, sensor 310 may be coupled to pin 6 of port 340 and so on. Sensors 322-336 may, for example, be arranged linearly and may be coupled to individual pins of input and/or output port 342, such that sensor 336 may be coupled to pin 8 of port 342, sensor 334 may be coupled to pin 7 of port 342, sensor 332 may be coupled to pin 6 of port 342 and so on. Each sensor of one sensor array may have a mate that corresponds to a sensor in another sensor array. Accordingly, for example, sensor 306 may be mated with sensor 336, sensor 308 may be mated with sensor 334, sensor 310 may be mated with sensor 332 and so on. Mated sensors of each sensor array may be coupled to individual pins of different input and/or output ports (e.g., sensors 306-320 may be coupled to individual pins of input and/or output port 340 and sensors 322-336 may be coupled to individual pins of input and/or output port 342).

Each pin of input and/or output ports 340 and 342 may be configured as an output, such that a signal (e.g., a current signal) that may be generated by sensing circuitry 344 may be used to charge each of sensors 306-336 individually. Each pin of input and/or output ports 340 and 342 may be configured as an input, such that each of sensors 306-336 may be individually discharged through sensing circuitry 344. A series of charge and discharge sequences for sensors 306-336 may be executed over time to determine a relative capacitance magnitude change (e.g., a capacitance magnitude increase) that may be exhibited by each of sensors 306-336.

By comparing the time-based capacitance characteristic of sensors 306-336 to a threshold capacitance value, a determination may be made, for example, as to when sensors 306-336 are in a proximity relationship to an external object. For example, a sequential increase in the relative capacitance magnitudes of two or more sensors 306-336 may be sensed to determine, for example, that an external object is moving substantially in direction 302 relative to card 300. A sequential increase in the relative capacitance magnitudes of two or more sensors 336-306 may be sensed to determine, for example, that an external object is moving substantially in direction 304 relative to card 300. Once sensed, processor 346 may, for example, cause dynamic magnetic stripe communications device 348 to generate an electromagnetic field having a variable polarity and/or magnitude to communicate one, two, and/or three tracks of magnetic stripe data to, for example, a read-head of a magnetic stripe reader.

A read-head may be sensed as moving in direction 302 relative to card 300 by sensing a sequential change (e.g., sequential increase) in a capacitance magnitude that may be exhibited by two or more sensors 306-336, respectively. Accordingly, for example, processor 346 may order data bits communicated by dynamic magnetic stripe communications device 348 in accordance with sensed direction 302 of movement of the read-head (e.g., a magnetic stripe message may be communicated from a beginning of the message to an end of the message based upon the sensed direction 302). Alternately, for example, a read-head may be sensed as moving in direction 304 relative to card 300 by sensing a sequential change (e.g., sequential increase) in a capacitance magnitude that may be exhibited by two or more sensors 336-306, respectively. Accordingly, for example, processor 346 may order data bits communicated by dynamic magnetic stripe communications device 348 in accordance with sensed direction 304 of movement of the read-head (e.g., a magnetic stripe message may be communicated from an end of the message to the beginning of the message based upon the sensed direction 304).

Processor 346 may, for example, detect a presence of a read-head early in a swipe event of card 300 (e.g., a position of a read-head of a magnetic stripe reader may be detected near a leading edge of card 300). Accordingly, for example, a capacitance change (e.g., capacitance increase) of one or more sensors (e.g., sensors 306-310 or sensors 336-332) may be sensed by processor 346. In so doing, for example, processor 346 may control dynamic magnetic stripe communications device 348 to communicate data bits at a relatively slow communication rate, since a read-head may remain within a communication distance of card 300 for a relatively large amount of time based upon the early detection of the read-head.

Processor 346 may, for example, detect a presence of a read-head at a mid-point in a swipe event of card 300 (e.g., a position of a read-head of a magnetic stripe reader may be detected between a leading edge of card 300 and an inner portion of card 300). Accordingly, for example, a capacitance change (e.g., capacitance increase) of one or more sensors (e.g., sensors 310-314 or sensors 332-328) may be sensed by processor 346. In so doing, for example, processor 346 may control dynamic magnetic stripe communications device 348 to communicate data bits at a relatively medium communication rate, since a read-head may remain within a communication distance of card 300 for a relatively medium amount of time based upon the midpoint detection of the read-head.

Processor 346 may, for example, detect a presence of a read-head late in a swipe event of card 300 (e.g., a position of a read-head of a magnetic stripe reader may be detected at an inner portion of card 300). Accordingly, for example, a capacitance change (e.g., capacitance increase) of one or more sensors (e.g., sensors 314-318 or sensors 328-324) may be sensed by processor 346. In so doing, for example, processor 346 may control dynamic magnetic stripe communications device 348 to communicate data bits at a relatively fast communication rate, since a read-head may remain within a communication distance of card 300 for a relatively small amount of time based upon the late detection of the read-head.

Figure 4:
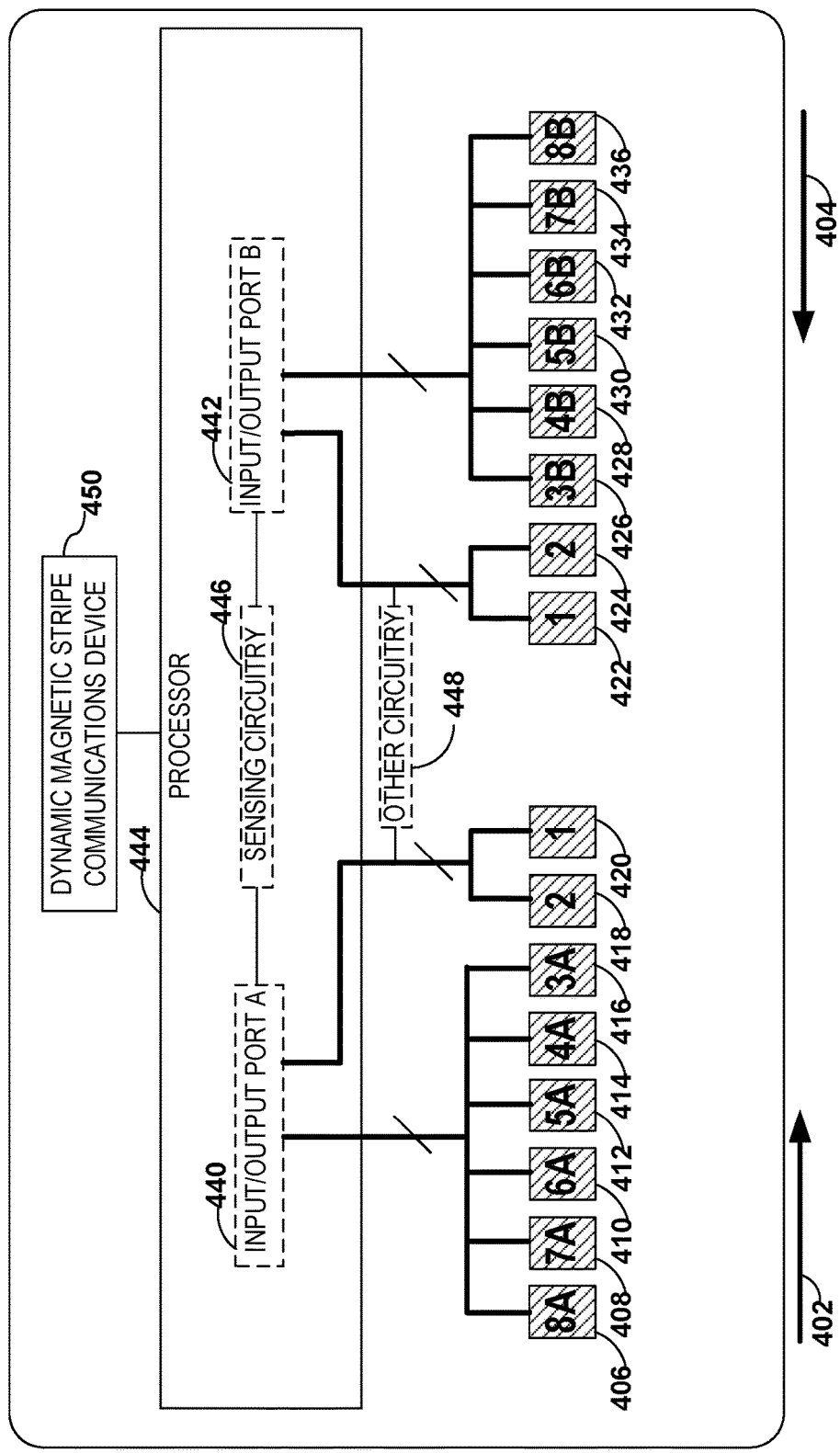
FIG. 4 is an illustration of a card constructed in accordance with the principles of the present invention.

FIG. 4 shows card 400, which may include processor 444 and multiple (e.g., three) arrays of sensors (e.g., sensors 406-416, sensors 426-436, and sensors 418-424). Sensors 406-416 may, for example, be arranged linearly and may be coupled to individual pins of input and/or output port 440, such that sensor 406 may be coupled to pin 8 of port 440, sensor 408 may be coupled to pin 7 of port 440, sensor 410 may be coupled to pin 6 of port 440 and so on. Sensors 426-436 may, for example, be arranged linearly and may be coupled to individual pins of input and/or output port 442, such that sensor 436 may be coupled to pin 8 of port 442, sensor 434 may be coupled to pin 7 of port 442, sensor 432 may be coupled to pin 6 of port 442 and so on. Each sensor of one sensor array may have a mate that corresponds to a sensor in another sensor array. Accordingly, for example, sensor 406 may be mated with sensor 436, sensor 408 may be mated with sensor 434, sensor 410 may be mated with sensor 432 and so on. Mated sensors of each sensor array may or may not share the same pin of input and/or output ports 440 and 442.

Sensors 418-424 may, for example, share pins of input and/or output ports 440 and/or 442 with other circuitry 448 (e.g., an IR transceiver, an LED, a button, or any other device). For example, sensors 418 through 424 may interoperate with sensors 406-416 and/or 426-436 while processor 444 may be detecting a presence of an object within a proximity of card 400. Alternately, for example, processor 444 may reconfigure one or more pins of input and/or output ports 440 and/or 442 so that other circuitry 448 may be utilized. For example, other circuitry 448 may be sensitive to other data signals (e.g., IR data signals) when processor 444 may be exchanging information with an IR transceiver via other circuitry 448. Accordingly, for example, one or more sensors 418-424 may be disabled while one or more pins of input and/or output ports 440 and/or 442 may be used to perform other functions (e.g., exchange IR information).

Sensors 406-420 and 436-422 may, for example, be used by processor 444 for detecting a presence of a read-head of a magnetic stripe reader. A capacitance change (e.g., a capacitance increase) may, for example, be detected by processor 444 via sensing circuitry 446 and two or more sensors (e.g., sensors 406-410) for an early detection of a read-head moving in direction 402. Accordingly, for example, processor 444 may conduct a communication sequence with the detected read-head via dynamic magnetic stripe communications device 450 at a relatively slow communication rate due to the early detection of the read-head. In addition, processor 444 may conduct a communication sequence with the detected read-head via dynamic magnetic stripe communications device 450 using data bits ordered in a particular ordering sequence (e.g., from a beginning of a magnetic stripe message to the end of the magnetic stripe message) based upon detected direction 402.

A capacitance change (e.g., a capacitance increase) may, for example, be detected by processor 444 via sensing circuitry 446 and two or more sensors (e.g., sensors 436-432) for an early detection of a read-head moving in direction 404. Accordingly, for example, processor 444 may conduct a communication sequence with the detected read-head via dynamic magnetic stripe communications device 450 at a relatively slow communication rate due to the early detection of the read-head. In addition, processor 444 may conduct a communication sequence with the detected read-head via dynamic magnetic stripe communications device 450 using data bits ordered in a particular ordering sequence (e.g., from an end of a magnetic stripe message to the beginning of the magnetic stripe message) based upon detected direction 404.

Midpoint detections of a read-head may be sensed by processor 444 in conjunction with sensing circuitry 446 via two or more sensors (e.g., sensors 412-416 in direction 402 or sensors 430-426 in direction 404). Accordingly, for example, processor 444 may conduct communications with the detected read-head via dynamic magnetic stripe communications device 450 at a communication rate (e.g., a medium communication rate) and communication order (e.g., beginning to end or end to beginning) that corresponds to a detected direction of movement and initial relative position of a read-head of a magnetic stripe reader.

Late detections of a read-head may be sensed by processor 444 in conjunction with sensing circuitry 446 via two or more sensors (e.g., sensors 416-420 in direction 402 or sensors 426-422 in direction 404). Accordingly, for example, processor 444 may conduct communications with the detected read-head via dynamic magnetic stripe communications device 450 at a communication rate (e.g., a fast communication rate) and communication order (e.g., beginning to end or end to beginning) that corresponds to a detected direction of movement and an initial relative position of a read-head of a magnetic stripe reader.

Figure 5:
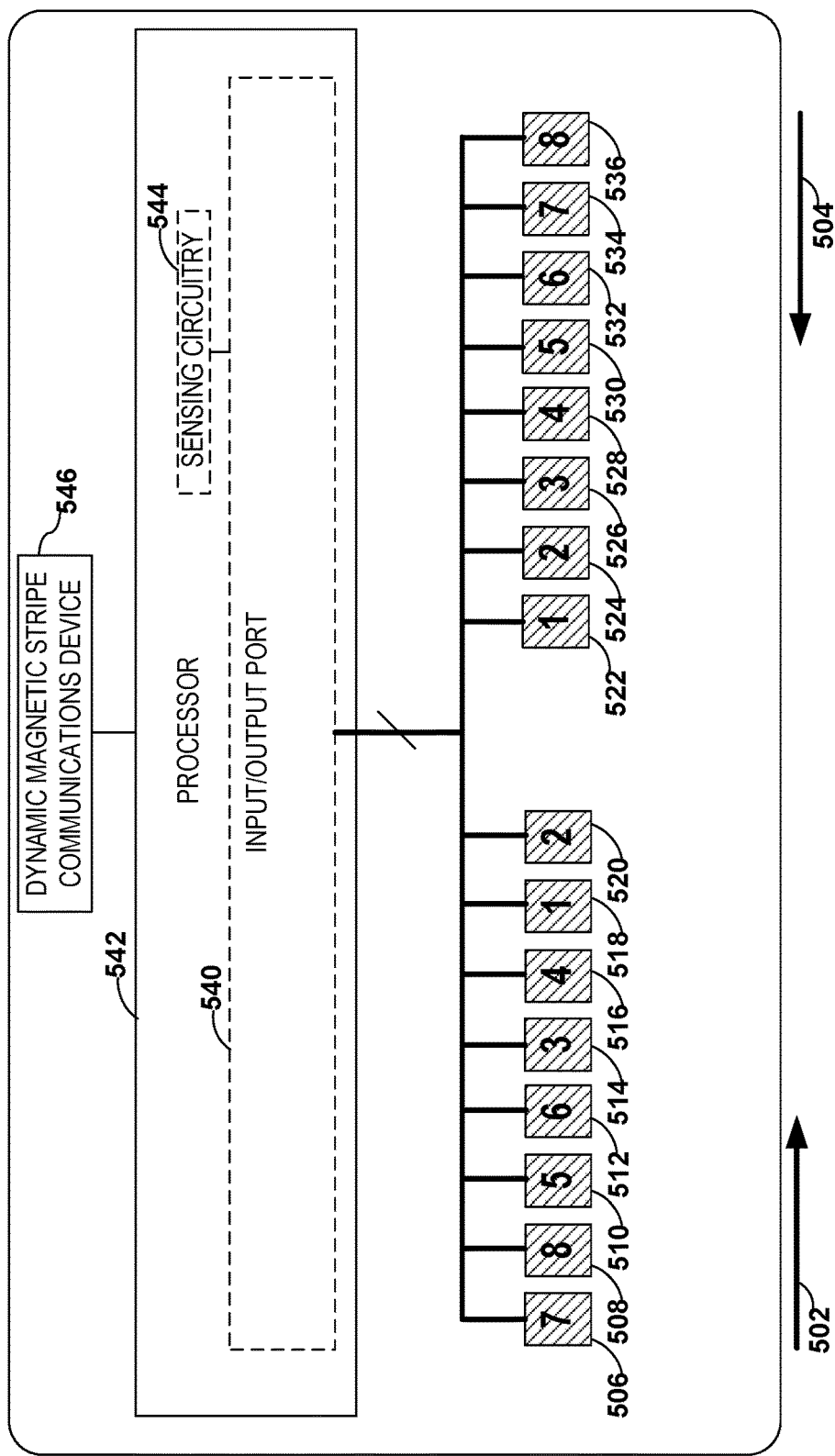
FIG. 5 is an illustration of a card constructed in accordance with the principles of the present invention.

FIG. 5 shows card 500, which may include processor 542 having a single input and/or output port 540 and multiple sensor arrays (e.g., sensors 506-520 and sensors 522-536). Each sensor of one sensor array may have a mate that corresponds to a sensor in another sensor array. Accordingly, for example, sensor 506 may be mated with sensor 536, sensor 508 may be mated with sensor 534, sensor 510 may be mated with sensor 532 and so on. Mated sensors of each sensor array may not, for example, share the same pin of input and/or output port 442.

Input and/or output port 540 may, for example, be limited to a number (e.g., eight) pins such that a number of (e.g., sixteen) sensors may be higher than a number of pins of input and/or output port 540 that may be used to connect to sensors 506-536. Accordingly, for example, two or more sensors (e.g., a non-mated pair of sensors) may be cross-coupled to corresponding pins of input and/or output port 540. In so doing, for example, sensors 508 and 536 may share pin 8 of input and/or output port 540, sensors 506 and 534 may share pin 7 of input and/or output port 540, sensors 512 and 532 may share pin 6 of input and/or output port 540 and so on to cross-couple non-mated pairs of sensors in sensor arrays 506-520 and 522-536 so as to maintain a direction sensing capability of processor 542.

Such cross-coupling of sensors may yield an ability of processor 542 to detect a direction of movement of an object (e.g., a read-head of a magnetic stripe reader) based upon a detected order of activation of two or more sensors. For example, a read-head of a magnetic stripe reader may be detected by processor 542 via sensing circuitry 544 as moving in direction 504 when two or more pins 1 through 8 of input and/or output port 540 detect signals from activated sensors in a particular sequence (e.g., when sensors 536 (pin 8), 534 (pin 7), 532 (pin 6), and 530 (pin 5) are activated in sequence or when sensors 520 (pin 2), 518 (pin 1), 516 (pin 4), and 514 (pin 3) are activated in sequence). Alternately, for example, a read-head of a magnetic stripe reader may be detected by processor 542 via sensing circuitry 544 as moving in direction 502 when two or more pins 1 through 8 of input and/or output port 540 detect signals from activated sensors in a particular sequence (e.g., when sensors 506 (pin 7), 508 (pin 8), 510 (pin 5), and 512 (pin 6) are activated in sequence or when sensors 522 (pin 1), 524 (pin 2), 526 (pin 3), and 528 (pin 4) are activated in sequence). Processor 542 may, for example, communicate magnetic stripe information via dynamic magnetic stripe communications device 546 at a communication rate and with a communication order based upon such detections of a read-head of a magnetic stripe reader.

Figure 6:
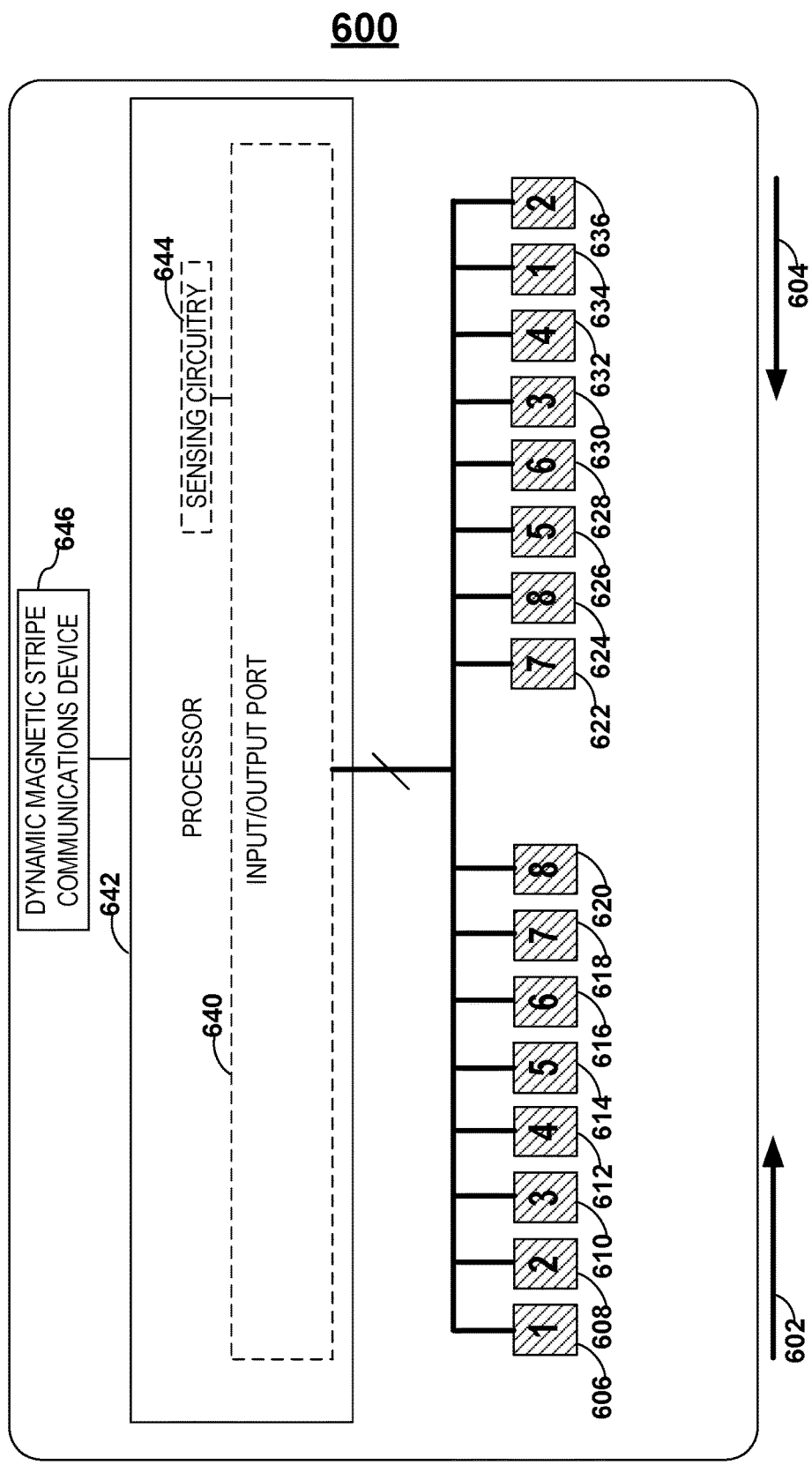
FIG. 6 is an illustration of a card constructed in accordance with the principles of the present invention.

FIG. 6 shows card 600, which may include processor 642 having a single input and/or output port 640 and multiple arrays of sensors (e.g., sensors 606-620 and sensors 622-636). Non-mated sensors 606 and 634 may share pin 1 of input and/or output port 640, non-mated sensors 608 and 636 may share pin 2 of input and/or output port 640, non-mated sensors 610 and 630 may share pin 3 of input and/or output port 640 and so on to cross-couple non-mated pairs of sensors 606-636 so as to maintain a direction sensing capability of processor 642.

Such cross-coupling of sensors may yield an ability of processor 642 to detect a direction of movement of an object (e.g., a read-head of a magnetic stripe reader) based upon a detected order of activation of two or more sensors. For example, a read-head of a magnetic stripe reader may be detected by processor 642 via sensing circuitry 644 as moving in direction 602 when two or more pins 1 through 8 of input and/or output port 640 detect signals from activated sensors in a particular sequence (e.g., when sensors 606 (pin 1), 608 (pin 2), 610 (pin 3), and 612 (pin 4) are activated in sequence or when sensors 622 (pin 7), 624 (pin 8), 626 (pin 5), and 628 (pin 6) are activated in sequence). Alternately, for example, a read-head of a magnetic stripe reader may be detected by processor 642 via sensing circuitry 644 as moving in direction 604 when two or more pins 1 through 8 of input and/or output port 640 detect signals from activated sensors in a particular sequence (e.g., when sensors 636 (pin 2), 634 (pin 1), 632 (pin 4), and 630 (pin 3) are activated in sequence or when sensors 620 (pin 8), 618 (pin 7), 616 (pin 6), and 614 (pin 5) are activated in sequence). Processor 642 may, for example, communicate magnetic stripe information via dynamic magnetic stripe communications device 646 at a communication rate and with a communication order based upon such detections of a read-head of a magnetic stripe reader.

Figure 7:
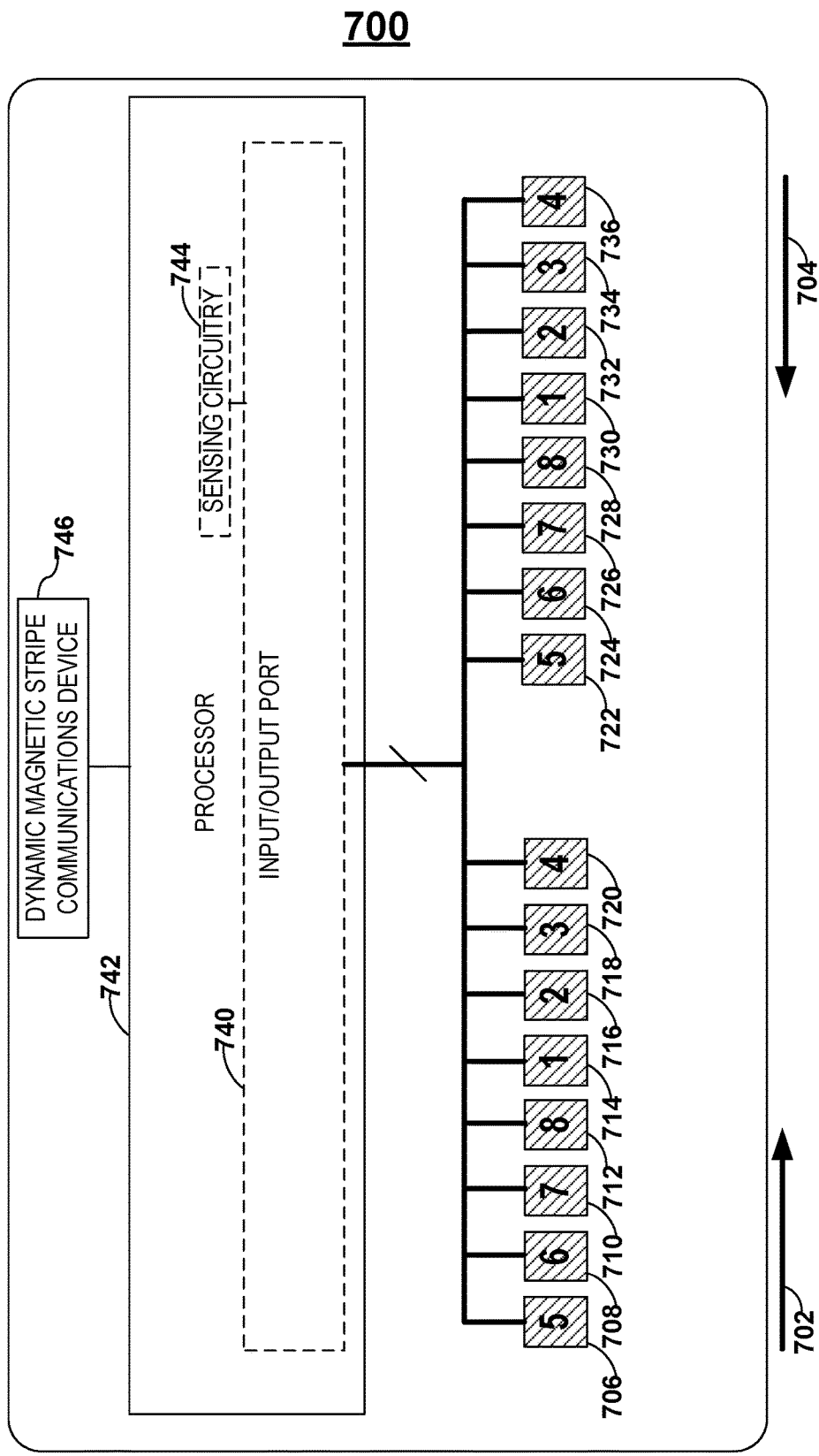
FIG. 7 is an illustration of a card constructed in accordance with the principles of the present invention.

FIG. 7 shows card 700, which may include processor 742 having a single input and/or output port 740 and multiple arrays of sensors (e.g., sensors 706-720 and sensors 722-736). Non-mated sensors 714 and 730 may share pin 1 of input and/or output port 740, non-mated sensors 716 and 732 may share pin 2 of input and/or output port 740, non-mated sensors 718 and 734 may share pin 3 of input and/or output port 740 and so on to cross-couple non-mated pairs of sensors 706-736 so as to maintain a direction sensing capability of processor 742.

Such cross-coupling of sensors may yield an ability of processor 742 to detect a direction of movement of an object (e.g., a read-head of a magnetic stripe reader) based upon a detected order of activation of two or more sensors. For example, a read-head of a magnetic stripe reader may be detected by processor 742 via sensing circuitry 744 as moving in direction 702 when two or more pins 1 through 8 of input and/or output port 740 detect signals from activated sensors in a particular sequence (e.g., when sensors 706 (pin 5), 708 (pin 6), 710 (pin 7), and 712 (pin 8) are activated in sequence or when sensors 722 (pin 5), 724 (pin 6), 726 (pin 7), and 728 (pin 8) are activated in sequence). Alternately, for example, a read-head of a magnetic stripe reader may be detected by processor 742 via sensing circuitry 744 as moving in direction 704 when two or more pins 1 through 8 of input and/or output port 740 detect signals from activated sensors in a particular sequence (e.g., when sensors 736 (pin 4), 734 (pin 3), 732 (pin 2), and 730 (pin 1) are activated in sequence or when sensors 720 (pin 4), 718 (pin 3), 716 (pin 2), and 714 (pin 1) are activated in sequence). Processor 742 may, for example, communicate magnetic stripe information via dynamic magnetic stripe communications device 746 at a communication rate and with a communication order based upon such detections of a read-head of a magnetic stripe reader.

Figure 8:
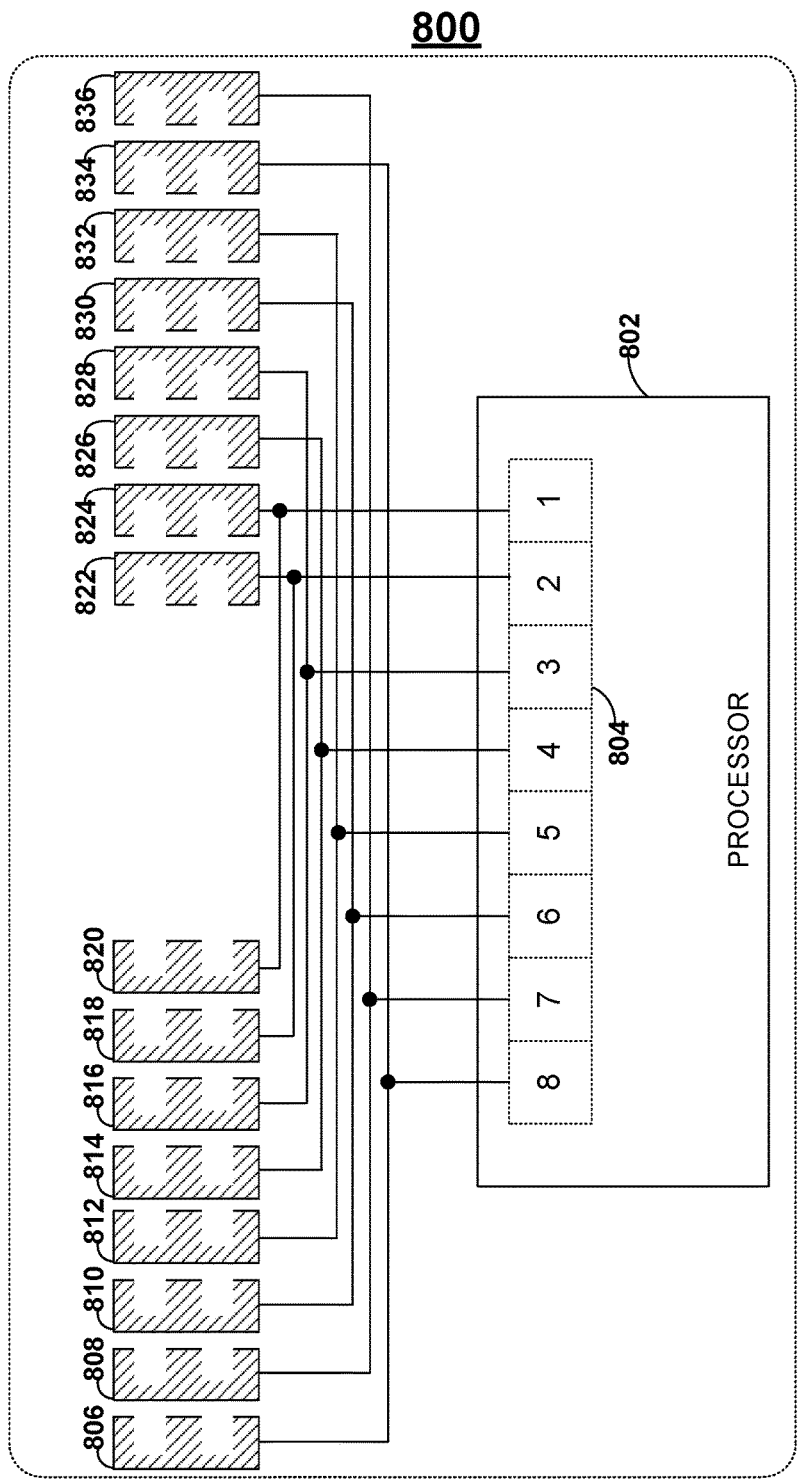
FIG. 8 is an illustration of a card constructed in accordance with the principles of the present invention.

FIG. 8 shows card 800, which may include processor 802 having a single input and/or output port 804 and multiple arrays of sensors (e.g., sensors 806-820 and sensors 822-836) cross-coupled to pins of input and/or output port 804 such that certain pairs of sensors share certain pins of input and/or output port 804. Sensor 806 may be coupled to sensor 834 at pin 8 of input and/or output port 804. Sensor 808 may be coupled to sensor 836 at pin 7 of input and/or output port 804. Sensor 810 may be coupled to sensor 830 at pin 6 of input and/or output port 804. Sensor 812 may be coupled to sensor 832 at pin 5 of input and/or output port 804. Sensor 814 may be coupled to sensor 826 at pin 4 of input and/or output port 804. Sensor 816 may be coupled to sensor 828 at pin 3 of input and/or output port 804. Sensor 818 may be coupled to sensor 822 at pin 2 of input and/or output port 804. Sensor 820 may be coupled to sensor 824 at pin 1 of input and/or output port 804. Sensors 806-820 and sensors 822-836 may be any shape and any size.

Persons skilled in the art will appreciate that any number of non-mated pairs of sensors (e.g., more or less than eight pairs of sensors) may be cross-coupled to share specific pins of an input and/or output port of a processor. Persons skilled in the art will further appreciate that any number of input and/or output ports (e.g., two or more) may be coupled to non-mated pairs of sensors. Accordingly, for example, a direction sensing capability of a processor of a card may be maintained.

Figure 9:
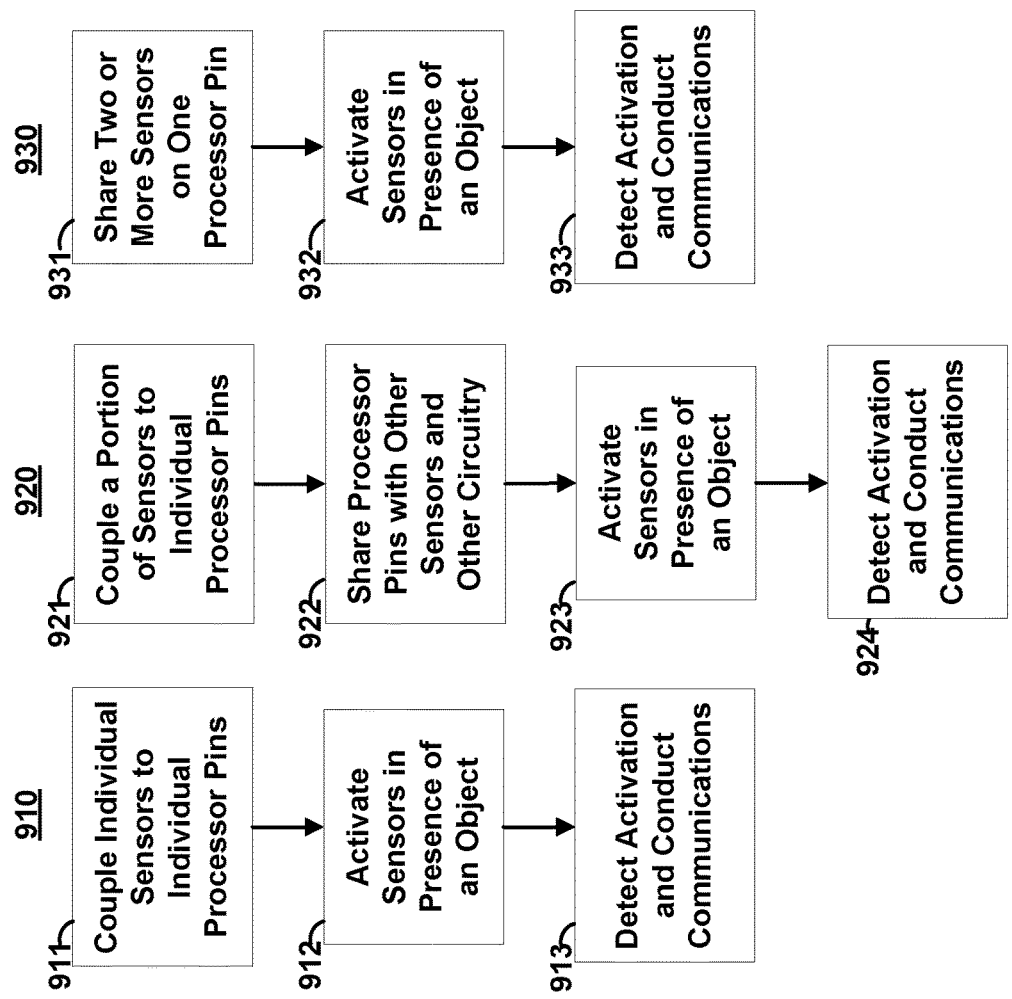
FIG. 9 is an illustration of a process flow chart constructed in accordance with the principles of the present invention.

FIG. 9 shows flow charts of sequences 910-930. In step 911 of sequence 910, for example, each sensor of a card may be coupled to an individual input and/or output pin of a processor port on the card. The processor may, for example, include sensing circuitry (e.g., capacitance change sensing circuitry) such that when an external object is in proximity to a sensor, the sensor may be activated (e.g., a capacitance of the sensor may increase) and the sensing circuitry of the processor may sense the object's presence (e.g., as in step 912) by sensing a signal from the activated sensor. In step 913, a processor may conduct communications (e.g., electromagnetic communications) with the detected object (e.g., a read-head of a magnetic stripe reader) by communicating data to the detected read-head at a selected communication bit rate (e.g., slow, medium or fast communication bit rate) and a selected communication bit order (e.g., forward or reverse communication bit order) based upon a direction and location of the detected read-head in relation to the card.

In step 921 of sequence 920, for example, a portion of sensors of a card may be coupled to individual input and/or output pins of a processor port on the card. Other sensors may share other input and/or output pins of a processor port as in step 922. Accordingly, for example, other circuitry (e.g., IR communication circuitry) may share pins of a processor port so that multiple functions (e.g., object sensing functions and IR communication functions) may be performed by the same processor pin but at different times. In step 923, sensors coupled to individual pins of a processor port may be activated (e.g., capacitance increased) and such activation may be detected (e.g., as in step 924). Accordingly, for example, a position and direction of a detected external object (e.g., a read-head of a magnetic stripe reader) may be used to adjust a communication rate and a communication order that a processor may use to communicate electromagnetic data (e.g., one, two, and/or three tracks of magnetic stripe data) to the detected read-head.

In step 931 of sequence 930, multiple sensors (e.g., selected pairs of sensors) may be cross-coupled to selected input and/or output pins of a processor port on a card, such that each pair of cross-coupled sensors may share an input and/or output pin of a processor. In step 932, for example, each sensor may be activated (e.g., each sensor's capacitance may increase) in the presence of an external object (e.g., a read-head of a magnetic stripe reader). Based upon an order of activation of two or more sensors, a communication sequence may be conducted by a processor of the card (e.g., as in step 933). For example, a set of sensors may be activated by an object moving in relation to a card and the activation may be detected differently by a processor of a card based upon a relative direction of movement of the detected object. Accordingly, for example, the cross-coupling of step 931 may cause a processor of a card to detect a particular sequence of activated sensors when an object moves in one direction relative to the card and the processor may detect a different sequence of activated sensors when the object moves in the opposite direction relative to the card. In so doing, multiple sensors may share input and/or output pins of a processor port and a processor of a card may nevertheless differentiate a direction of movement of an external object based upon a detection of two or more activated sensors.

Persons skilled in the art will also appreciate that the present invention is not limited to only the embodiments described. Instead, the present invention more generally involves dynamic information and the exchange thereof. Persons skilled in the art will also appreciate that the apparatus of the present invention may be implemented in other ways than those described herein. All such modifications are within the scope of the present invention, which is limited only by the claims that follow.

What is claimed is:

1. A device, comprising:
    a processor including a first port and a second port;
    a first plurality of conductive pads coupled to the first port, the first conductive pads and the first port coupled to a first node;
    a second plurality of conductive pads coupled to the second port, the second conductive pads and the second port coupled to a second node; and
    a component coupled to the first node.

2. The device of claim 1, wherein the component includes a communications device.

3. The device of claim 1, wherein the component includes a light emitting device.

4. The device of claim 1, wherein the component is a light emitting diode.

5. The device of claim 1, wherein the component includes an input device.

6. The device of claim 1, wherein the component includes a manual input device.

7. The device of claim 1, wherein the component includes a transmitter.

8. The device of claim 1, wherein the component includes a receiver.

9. The device of claim 1, wherein the component is a transceiver.

10. The device of claim 1, wherein at least one of the first plurality of conductive pads is a sensor, and
    the component includes a light emitting diode.

11. The device of claim 1, wherein at least one of the first plurality of conductive pads is a sensor, and
    the component includes a button.

12. The device of claim 1, wherein at least one of the first plurality of conductive pads is a sensor, and
    the component includes a receiver.

13. The device of claim 1, wherein the first plurality of conductive pads is a conductive pad of a first transducer,
    the component includes a second transducer, and
    the second transducer is coupled to the second node.

14. The device of claim 1, wherein at least one of the first plurality of conductive pads is a conductive pad of a transducer, and
    the component includes an electromagnetic transducer.

15. The device of claim 1, wherein at least one of the first plurality of conductive pads is a conductive pad of a capacitive transducer, and
    the component includes an electromagnetic transducer.

16. The device of claim 1, wherein the first plurality of conductive pads are part of a capacitive transducer, and
    the component includes an bidirectional transducer.

17. The device of claim 1, further comprising:
    a pin coupled between the first node and the first plurality of conductive pads,
    wherein the processor is operable to reconfigure the pin, and
    the component includes an bidirectional transducer.

18. The device of claim 1, further comprising:
    a pin coupled between the first node and the first plurality of conductive pads,
    wherein the processor is operable to disable the first plurality of conductive pads during performance of a function of the component, and
    the component includes an bidirectional transducer.

* * * * *